United States Patent
Bertin

(10) Patent No.: US 6,911,511 B1
(45) Date of Patent: Jun. 28, 2005

(54) CONTROLLED RADICAL POLYMERIZATION PROCESS USING A SMALL AMOUNT OF STABLE FREE RADICAL

(75) Inventor: Denis Bertin, Motteville (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/215,367

(22) Filed: Dec. 18, 1998

(30) Foreign Application Priority Data

Dec. 30, 1997 (FR) .............................................. 97 16690

(51) Int. Cl.$^7$ .................................................. C08F 2/38
(52) U.S. Cl. .................... 526/227; 526/220; 526/317.1; 526/318; 525/94; 525/27; 525/263
(58) Field of Search ................................ 526/227, 220, 526/317.1, 318; 525/94, 27, 263

(56) References Cited

U.S. PATENT DOCUMENTS

| | | | |
|---|---|---|---|
| 4,581,429 A | 4/1986 | Solomon et al. | 526/220 |
| 5,412,047 A | 5/1995 | Georges et al. | 526/220 |
| 5,449,724 A | 9/1995 | Moffat et al. | 526/220 |
| 5,610,250 A | * 3/1997 | Veregin et al. | 526/212 |
| 5,919,871 A | 7/1999 | Nicol et al. | 525/333.8 |

FOREIGN PATENT DOCUMENTS

| | | |
|---|---|---|
| EP | 0 735 052 A2 | 10/1996 |
| EP | 0 735 064 A1 | 10/1996 |
| EP | 0 773 232 A1 | 5/1997 |
| EP | 0 780 733 A1 | 6/1997 |
| WO | WO 94/11412 | 5/1994 |
| WO | WO 95/26987 | 10/1995 |
| WO | WO 96/24620 | 8/1996 |

OTHER PUBLICATIONS

D. Griller et al., "Persistent Carbon–Centered Radicals", Accounts of Chemical Research, vol. 9, pp. 13–19 (1976).

A. Forrester et al., "Organic Chemistry Of Stable Free Radicals", Table of Contents, Academic Press, 1968.

* cited by examiner

Primary Examiner—James J. Seidleck
Assistant Examiner—Olga Asinovsky
(74) Attorney, Agent, or Firm—Smith, Gambrell and Russell, LLP

(57) ABSTRACT

The invention relates to a process for the polymerization of at least one monomer which can be polymerized via a radical route, in the presence of a stable free radical and of a polymerization initiator, such that, per 100 mol of monomer, the molar amounts of stable radical (SFR) and of initiator (INIT) are such that $[(SFR) \times F_{SFR}]/[(INIT) \times F_{INIT}] < 0.15$ and $F_{SFR} \times (SFR) < 0.2$ mol, in which $F_{SFR}$ represents the functionality of the stable free radical and $F_{INIT}$ represents the functionality of the initiator. The process according to the invention has advantageous kinetics, allows the production of grafted or block copolymers and can be carried out in an extruder.

29 Claims, No Drawings

CONTROLLED RADICAL POLYMERIZATION PROCESS USING A SMALL AMOUNT OF STABLE FREE RADICAL

TECHNICAL BACKGROUND OF THE INVENTION

The invention relates to a process for the polymerization or copolymerization of at least one monomer which can be polymerized or copolymerized via a radical route, in the presence of a stable free radical and of a polymerization or copolymerization initiator.

BRIEF DESCRIPTION OF THE RELATED ART

Radical polymerization in the presence of a stable free radical can lead to a polymer with narrow polydispersity. According to the prior art, high concentrations of stable free radical are required to obtain such an effect. The use of such amounts of stable free radical is economically disadvantageous and, furthermore, can pose toxicity or organoleptic problems depending on the use of the final polymer or copolymer. Furthermore, these processes of the prior art have very slow kinetics and do not even make it possible to polymerize or copolymerize certain monomers such as methacrylates. The process according to the invention offers a solution to the abovementioned problems since it allows the use of a very small amount of stable free radical, while at the same time leading, at high rates, to polymers or copolymers with narrow polydispersity, even for methacrylates.

The process according to the invention allows the preparation of block polymers and grafted polymers whose grafts can be block polymers.

SUMMARY OF THE INVENTION

The process according to the invention comprises a step of polymerization or copolymerization of at least one monomer which can be polymerized via a radical route, in the presence of a polymerization or copolymerization initiator and of a stable free radical, the said step being such that, per 100 mol of monomer, if (SFR) represents the number of moles of stable free radical in the polymerization or copolymerization medium, if $F_{SFR}$ represents the functionality of the stable free radical, i.e. the number of sites on the same stable free radical molecule in stable free radical form, if (INIT) represents the number of moles of polymerization or copolymerization initiator in the polymerization or copolymerization medium, if $F_{INIT}$ represents the functionality of the initiator, i.e. the number of sites in free radical form which each initiator molecule is capable of generating, the following relationships exist:

$$\frac{F_{SFR} \times (SFR)}{F_{INIT} \times (INIT)} < 0.15$$

and $$F_{SFR} \times (SFR) < 0.2 \text{ mol.}$$

DETAILED DESCRIPTION OF THE PREFERRED EMBODIMENTS

As example of a stable free radical whose functionality $F_{SFR}$ is equal to 1, mention may be made of a molecule represented by

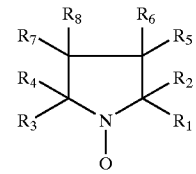

in which the groups $R_1$, $R_2$, $R_3$, $R_4$, $R_5$, $R_6$, $R_7$ and $R_8$ represent alkyl radicals.

As an example of a stable free radical whose functionality $F_{SFR}$ is equal to 2, mention may be made of a molecule represented by:

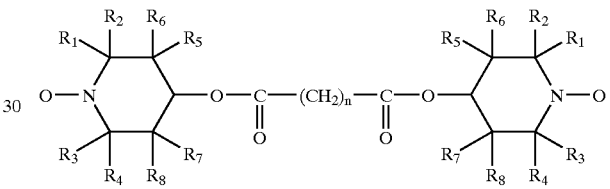

in which the groups $R_1$, $R_2$, $R_3$, $R_4$, $R_5$, $R_6$, $R_7$ and $R_8$ represent alkyl radicals and n represents a non-zero integer.

As an example of an initiator whose functionality $F_{INIT}$ is 2, mention may be made of dicumyl peroxide.

As an example of an initiator whose functionality $F_{INIT}$ is 4, mention may be made of ethyl 3,3-di(tert-amylperoxy) butyrate, which can be represented by:

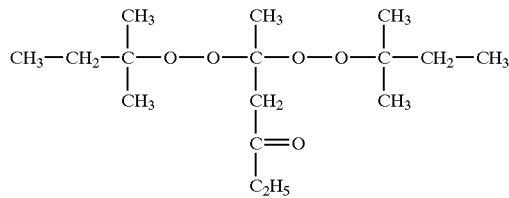

since it contains two —O—O— sequences which are each capable of generating two sites in free radical form, i.e. —O*.

Needless to say, it does not constitute a departure from the context of the present invention to introduce the stable free radical in the form of a molecule comprising a group capable of generating a stable free radical during the step according to the invention.

For example, when, in the context of the step of the invention, a molecule is introduced comprising a group which may be represented by -A-Y, the said group being capable of generating a stable free radical Y* during the step according to the invention, all of the groups -A-Y introduced at the start should be taken into account in the context of the determination of the amount (SFR) mentioned above. Still in the context of this example, if, simultaneously with the formation of Y*, the group -A* is a polymerization or copolymerization initiator, all of the groups -A-Y introduced at the start should also be taken into account in the context of the determination of the amount (INIT) mentioned above.

As an example of a group which generates a stable free radical, mention may be made of the groups =N—O—X with which U.S. Pat. No. 4,581,429 is concerned, the said group being capable of generating in the polymerization or copolymerization medium a group =N—O*, which is a stable free radical, and a group X*, which is a free radical which initiates the polymerization of a monomer M, so as to form the sequence =N—O—(M)$_n$—X, n representing a non-zero integer.

The species =N—O—X is thus a stable free radical generator whose functionality $F_{SFR}$ is 1.

The species =N—O—X is also a polymerization or copolymerization initiator since it is capable of generating a p lymerization-initiating free radical, X*, and its initiator functionality $F_{INIT}$ is 1.

Preferably, per 100 mol of monomer, $F_{INIT} \times (INIT)$ ranges from 0.01 to 20 mol and more preferably from 0.1 to 2 mol.

Preferably, per 100 mol of monomer, $F_{SFR} \times (SFR)$ ranges from 0.0001 to 0.2 and more preferably from 0.0005 to 0.1.

Preferably, $$0.0005 < \frac{F_{SFR} \times (SFR)}{F_{INIT} \times (INIT)} < 0.15$$

More preferably, $$0.005 < \frac{F_{SFR} \times (SFR)}{F_{INIT} \times (INIT)} < 0.1$$

It is also possible to have $$0.005 < \frac{F_{SFR} \times (SFR)}{F_{INIT} \times (INIT)} < 0.05$$

The step of the process according to the invention can be carried out at from 100 to 250° C. and is preferably carried out at from 130 to 200° C.

The step of the process according to the invention can be carried out for a sufficient duration which depends on the desired degree of conversion of the monomer into polymer or copolymer. Short durations, of about 5 minutes to 2 hours, and more generally from 15 minutes to 1 hour, can even be obtained for degrees of conversion of monomer of greater than 50%, or even 90%.

The step of the process according to the invention can be carried out in the presence of a solvent, but also with very little solvent, or even in the absence of solvent. As an example, the solvent can be present in the proportion of from 0 to 50%, or even 0 to 20% and even 0 to 10%, of the weight of the sum of the mass of monomer and solvent. The term solvent is generally understood to refer to a liquid which is inert with respect to the reaction medium and which at least partially dissolves at least one monomer and/or polymer and/or copolymer under the polymerization or copolymerization conditions. Generally, if necessary, an organic solvent such as an aromatic compound, for instance toluene, xylene, benzene or ethylbenzene, or an aliphatic or alicyclic solvent, for instance cyclohexane, hexane or heptane, or an ether, such as diphenyl ether, is used.

The process according to the invention makes it possible to prepare block copolymers since the polymerization of a first monomer by the process according to the invention leads to a living polymer block. It is then possible to attach to this first block a block of another polymer by placing the first living polymer block in a polymerization medium of a second monomer. It is thus possible to prepare block copolymers, for example copolymers comprising one or more polystyrene blocks and one or more polybutadiene blocks, or copolymers comprising one or more polystyrene blocks and one or more methacrylate-type blocks.

Needless to say, it is possible to attach as many blocks as desired to the living polymer by placing it in a polymerization medium of a monomer from which it is desired to make a block.

Thus, the invention also relates to a process for the preparation of a block polymer comprising at least one step according to the invention, leading to a first living block, the said living block then being placed in the presence of at least one other monomer from which it is desired to make a block attached to the first block, so as to form a living diblock, and so on, depending on the number of blocks which it is desired to produce.

Thus, the present invention also relates to a process for the preparation of a diblock polymer, comprising a step of polymerization of a first monomer in accordance with the invention, so as to obtain a first living block, followed by a step during which the first living block is placed in the presence of a second monomer which is polymerized, so as to form a second block attached to the first block.

The present application thus also relates to a process for the preparation of a triblock polymer comprising a step of polymerization of a third monomer in the presence of the diblock polymer prepared in accordance with what has just been stated, so as to form a third block attached to the diblock polymer.

The formation of each block can be carried out at a different temperature. However, between the formation of two blocks, it is preferable not to lower the temperature of the medium to a temperature below the lower of the temperatures used for the formation of each of the two blocks. Preferably, the temperature of the medium is maintained at at least 100° C. throughout the process for formation of the blocks, i.e. during the formation of the blocks, but also between their formation.

As examples, the following block polymers can be prepared:
polystyrene-b-poly(methyl methacrylate),
polystyrene-b-poly(styrene sulphonate),
polystyrene-b-polyacrylamide,
polystyrene-b-polymethacrylamide,
poly(methyl methacrylate)-b-poly(ethyl acrylate),
polystyrene-b-poly(butyl acrylate),
polybutadiene-b-poly(methyl methacrylate),
polyisoprene-b-poly(styrene-co-acrylonitrile),
polybutadiene-b-poly(styrene-co-acrylonitrile),
poly(styrene-co-butyl acrylate)-b-poly(methyl methacrylate),
polystyrene-b-poly(vinyl acetate),
polystyrene-b-poly(2-hexylethyl acrylate),
polystyrene-b-poly(methyl methacrylate-co-hydroxyethyl acrylate),
polystyrene-b-polybutadiene-b-poly(methyl methacrylate),
polybutadiene-b-polystyrene-b-poly(methyl methacrylate),
polystyrene-b-poly(butyl acrylate)-b-polystyrene,
polystyrene-b-polybutadiene-b-polystyrene,
polystyrene-b-polyisoprene-b-polystyrene.

By virtue of the possibility of using little or no solvent, the process according to the invention can, for example, be carried out in an extruder. It is thus possible to prepare a polymer or copolymer in the extruder so as to obtain after extrusion a converted product, for example in the form of granules, profiles, tubes, sheets, films or plates.

A block polymer can be prepared at least partially, or even entirely, in the extruder. In this case, the process can be performed, for example, in one of the following two ways:

1. a first living block of a monomer is prepared in a reactor in accordance with the process according to the invention. This first block is then introduced into the extruder along with the second type of monomer which it is desired to place next to the first block, as second block. The copolymerization by formation of the second block is carried out in the extruder.
2. a first monomer is introduced into the top of the extruder and is polymerized in the first part of the extruder, in accordance with the process according to the invention. The second monomer is then introduced during extrusion of the first monomer block and the copolymerization by formation of the second block is carried out in the second part of the extruder.

Needless to say, the invention is not limited to the formation of homopolymers, random copolymers or diblock copolymers. Copolymers comprising more than two blocks can also be prepared, for example by introducing into an extruder as many monomers as there are blocks which it is desired to insert into the final copolymer.

If so desired, all of the polymerization steps leading to the block polymer can thus be carried out in an extruder.

The process according to the invention allows the preparation of polymers grafted with grafts of homopolymeric or block-polymeric nature. The reason for this is that the polymerization of a monomer in the presence of a stable free radical and of a polymerization macroinitiator leads to a block of living polymer grafted onto the polymer chain of the initial macroinitiator. The term macroinitiator is in fact understood to refer to a polymer in which at least one atom is capable of taking a radical form under the conditions of formation of the said block, the said radical form being capable of initiating the polymerization of the monomer intended to form the said block. Such macroinitiators are described in French Patent Application filed under the number 97/13383. The block thus formed is living since it has at its end a group capable of generating the stable free radical. It is thus possible to attach a second block to this first block by placing the polymer grafted with the first block in the presence of another monomer, so as to polymerize that monomer after the first block. After the formation of this second block, the polymer appears grafted with a diblock copolymer and still has at its end a group capable of generating the stable free radical.

Needless to say, it is possible to attach as many blocks as desired to the living polymer by placing it in a medium for polymerization of a monomer from which it is desired to make a block.

Thus, the invention also relates to a process for the preparation of a grafted polymer comprising at least one step according to the invention leading to a polymer grafted with a first living block, the said living block then being placed in the presence of at least one other monomer from which it is desired to make a block attached to the first block, so as to form a polymer grafted with a living diblock, and so on, depending on the number of blocks which it is desired to produce for the graft.

The formation of each block can be carried out at a different temperature. However, between the formation of two blocks, it is preferable not to lower the temperature of the medium to a temperature below the lower of the temperatures used for the formation of each of the two blocks. Preferably, the temperature of the medium is maintained at at least 100° C. throughout the process of formation of the blocks, i.e. during the formation of the blocks, but also between their formation.

As examples, the following grafted copolymers can be prepared:
polyethylene-g-polystyrene,
polyethylene-g-poly(methyl methacrylate),
polyethylene-g-poly(styrene-co-acrylonitrile),
polyethylene-g-poly(styrene-co-hydroxyethyl acrylate),
polyethylene-g-(polystyrene-b-poly(methyl methacrylate)),
polypropylene-g-polystyrene,
polypropylene-g-poly(methyl methacrylate),
polypropylene-g-poly(styrene-co-acrylonitrile),
polypropylene-g-(polystyrene-b-poly(methyl methacrylate)),
poly(ethylene-co-glycidyl methacrylate)-g-polystyrene,
poly(styrene-co-acrylonitrile),
polypropylene-g-(polystyrene-b-poly(methyl methacrylate)),
poly(ethylene-co-glycidyl methacrylate)-g-polystyrene,
poly(ethylene-co-glycidyl methacrylate)-g-poly(methyl methacrylate),
poly(ethylene-co-glycidyl methacrylate)-g-poly(styrene-co-acrylonitrile),
poly(ethylene-co-ethyl acrylate)-g-polystyrene,
poly(ethylene-co-ethyl acrylate)-g-poly(methyl methacrylate),
poly(ethylene-co-ethyl acrylate)-g-poly(styrene-co-acrylonitrile),
poly(ethylene-co-vinyl acetate)-g-polystyrene,
poly(ethylene-co-ethyl acrylate-co-maleic anhydride)-g-polystyrene,
poly(ethylene-co-ethyl acrylate-co-maleic anhydride)-g-poly(methyl methacrylate),
poly(ethylene-co-ethyl acrylate-co-maleic anhydride)-g-poly(styrene-co-acrylonitrile),
poly(ethylene-co-butyl acrylate)-g-polystyrene,
poly(ethylene-co-butyl acrylate)-g-poly(methyl methacrylate),
poly(ethylene-co-butyl acrylate)-g-poly(styrene-co-acrylonitrile),
poly(ethylene-co-ethyl acrylate-co-glycidyl methacrylate)-g-polystyrene,
poly(ethylene-co-ethyl acrylate-co-glycidyl methacrylate)-g-poly(methyl methacrylate),
poly(ethylene-co-ethyl acrylate-co-glycidyl methacrylate)-g-poly(styrene-co-acrylonitrile),
polycarbonate-g-polystyrene,
polycarbonate-g-poly(methyl methacrylate),
polycarbonate-g-poly(styrene-co-acrylonitrile).

Here also, the formation of the grafted polymer can be carried out at least partially, or even entirely, in an extruder. If so desired, all of the polymerization steps leading to the grafted polymer can be carried out in an extruder.

A stable free radical should not be confused with free radicals which are very short-lived (a few milliseconds), such as the free radicals derived from the usual polymerization initiators, for instance peroxides, hydroperoxides and azo-type initiators. Polymerization-initiating free radicals tend to accelerate the polymerization. In contrast, stable free radicals generally tend to slow down the polymerization. It can generally be stated that a free radical is stable within the sense of the present invention if it is not a polymerization initiator and if, under the working conditions of the present invention, the average lifetime of the radical is at least five minutes. During this average lifetime, the molecules of the stable free radical alternate continuously-between the radical form and the form of a group attached via a covalent bond to a polymer chain. Needless to say, it is preferable for the stable free radical to have good stability throughout its use in the context of the present invention. Generally, a stable free radical can be isolated in radical form at room temperature.

It is recalled that the notion of a stable free radical is known to those skilled in the art to denote a radical which is so persistent and so unreactive towards air and atmospheric moisture that the pure radical can be handled and stored with no more precautions at room temperature than for most commercial chemical products (see in this respect D. Griller and K. Ingold, Accounts of Chemical Research, 1976, 9, 13–19, or Organic Chemistry of Stable Free Radicals, A. Forrester et al., Academic Press, 1968).

The family of stable free radicals includes in particular compounds which act as radical polymerization inhibitors, stable nitroxide radicals, i.e. radicals comprising the group =N—O*. It is possible to use as stable free radical, for example, the radicals represented by the following formulae:

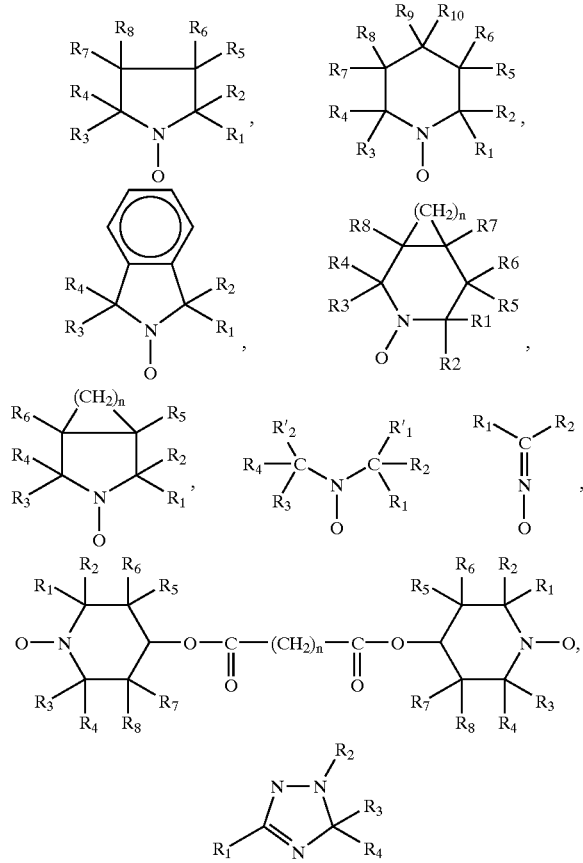

in which n represents a non-zero integer and $R_1$, $R_2$, $R_3$, $R_4$, $R'_1$ and $R'_2$, which may be identical or different, represent a halogen atom such as chlorine, bromine or iodine, a linear, branched or cyclic, saturated or unsaturated hydrocarbon-based group such as an alkyl or phenyl radical, or an ester group —COOR or an alkoxy group —OR, or a phosphonate group —PO(OR)$_2$, or a polymer chain which may be, for example, a poly(methyl methacrylate), polybutadiene or polyolefin chain such as a polyethylene or polypropylene chain, but preferably being a polystyrene chain, and in which $R_5$, $R_6$, $R_7$, $R_8$, $R_9$ and $R_{10}$, which may be identical or different, can be chosen from the same family of groups as that which has just been envisaged for $R_1$, $R_2$, $R_3$, $R_4$, $R'_1$ and $R'_2$, and can furthermore represent a hydrogen atom, a hydroxyl group —OH or an acid group such as —COOH or —PO(OH)$_2$ or —SO$_3$H.

In particular, the stable free radical can be 2,2,5,5-tetramethyl-1-pyrrolidinyloxy sold under the brand name PROXYL or 2,2,6,6-tetramethyl-1-piperidynyloxy, generally sold under the name TEMPO.

The stable free radical can also be chosen from the following list

N-tert-butyl-1-phenyl-2-methylpropyl nitroxide,

N-tert-butyl-1-(2-naphthyl)-2-methylpropyl nitroxide,

N-tert-butyl-1-diethylphosphono-2,2-dimethylpropyl nitroxide,

N-tert-butyl-1-dibenzylphosphono-2,2-dimethylpropyl nitroxide,

N-phenyl-1-diethylphosphono-2,2-dimethylpropyl nitroxide,

N-phenyl-1-diethylphosphono-1-methylethyl nitroxide,

N-(1-phenyl-2-methylpropyl)-1-diethylphosphono-1-methylethyl nitroxide, 4-hydroxy-2,2,6,6-tetramethyl-1-piperidyloxy, 4-oxo-2,2,6,6-tetramethyl-1-piperidyloxy, 2,4,6-tri-tert-butylphenoxy.

The initiator is a radical polymerization or copolymerization initiator. This initiator is preferably chosen such that its half-life at the temperature chosen for the step of the process according to the invention ranges from 30 seconds to 1 hour and preferably from 5 minutes to 30 minutes.

The initiator can be chosen, for example, from diacyl peroxides, peroxyesters, dialkyl peroxides and peroxyacetals.

The initiator can be chosen, for example, from the following list:

dibenzoyl peroxide, di(o-methylbenzoyl) peroxide, bis(3,5,5-trimethylhexanoyl) peroxide, didecanoyl peroxide, dilauroyl peroxide, tert-butyl peroxybenzoate, tert-butyl peroxy-3,5,5-trimethylhexanoate, 2,5-dimethyl-2,5-di(benzoylperoxy)hexane, OO-tert-butyl O-isopropyl monoperoxycarbonate, OO-tert-butyl O-(2-ethylhexyl) monoperoxycarbonate, tert-amyl peroxy-3,5,5-trimethylhexanoate, tert-butyl peroxy-2-ethylhexanoate, tert-amyl peroxy-2-ethylhexanoate, tert-butyl peroxypivalate, tert-amyl peroxypivalate, tert-butyl peroxyneodecanoate, tert-amyl peroxyneodecanoate, α-cumyl peroxyneodecanoate, 3-hydroxy-1,1-dimethylbutyl peroxyneodecanoate, 2,5-dimethyl-2,5-di(tert-butylperoxy)hexane, 2,5-dimethyl-2,5-di(tert-butylperoxy)hex-3-yne, tert-butyl cumyl peroxide, dicumyl peroxide, di-tert-butyl peroxide, 1,1-di(tert-butylperoxy)-3,3,5-trimethylcyclohexane, 1,1-di(tert-butylperoxy)cyclohexane,
2,2-di(tert-butylperoxy)butane,
n-butyl 4,4-di(tert-butylperoxy)valerate,
ethyl 3,3-di(tert-butylperoxy)butyrate,
ethyl 3,3-di(tert-amylperoxy)butyrate.

The term monomer is understood to refer to any monomer which can be polymerized or copolymerized via a radical route.

The monomer can be chosen from vinyl, vinylidene, diene, olefinic and allylic monomers.

The term vinyl monomers is understood to refer to (meth)acrylates, vinylaromatic monomers, vinyl esters, (meth)acrylonitrile, (meth)acrylamide and mono- and di($C_1$–$C_{18}$ alkyl)(meth)acrylamides, and monoesters and diesters of maleic anhydride and of maleic acid.

The (meth)acrylates are, in particular, those of the respective formulae:

in which $R^0$ is chosen from linear or branched, primary, secondary or tertiary $C_1$–$C_{18}$ alkyl radicals, $C_5$–$C_{18}$ cycloalkyl radicals, ($C_1$–$C_{18}$)alkoxy($C_1$–$C_{18}$)alkyl radicals, ($C_1$–$C_{18}$)alkylthio($C_1$–$C_{18}$)alkyl radicals, aryl radicals and arylalkyl radicals, these radicals being optionally substituted with at least one halogen atom and/or at least one hydroxyl group after protection of this hydroxyl group, the above alkyl groups being linear or branched; and glycidyl, norbornyl and isobornyl (meth)acrylates.

As examples of useful methacrylates, mention may be made of methyl, ethyl, 2,2,2-trifluoroethyl, n-propyl, isopropyl, n-butyl, sec-butyl, tert-butyl, n-amyl, isoamyl, n-hexyl, 2-ethylhexyl, cyclohexyl, octyl, isooctyl, nonyl, decyl, lauryl, stearyl, phenyl, benzyl, β-hydroxyethyl, isobornyl, hydroxypropyl or hydroxybutyl methacrylate.

As examples of acrylates of the above formula, mention may be made of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl or ethoxyethyl acrylate.

For the purposes of the present invention, the term vinylaromatic monomer is understood to refer to an aromatic monomer containing ethylenic unsaturation, such as styrene, vinyltoluene, α-methylstyrene, 4-methylstyrene, 3-methylstyrene, 4-methoxystyrene, 2-(hydroxymethyl) styrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

As vinyl esters, mention may be made of vinyl acetate, vinyl propionate, vinyl chloride and vinyl fluoride.

As vinylidene monomer, mention is made of vinylidene fluoride.

The term diene monomer is understood to refer to a diene chosen from linear or cyclic, conjugated or non-conjugated dienes such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylidene tetrahydroindene.

As olefinic monomers, mention may be made of ethylene, butene, hexene and 1-octene. Fluoroolefinic monomers may also be mentioned.

EXAMPLE 1

Preparation of a Homopolyatyrene in the Presence of Tempo

The reagents below are introduced at room temperature into a 100 ml glass round-bottomed flask under a nitrogen atmosphere, fitted with a mechanical stirrer and a temperature-adjustment system:

40 g of styrene (i.e. 0.385 mol),
0.21 g of dicumyl peroxide (i.e. $7.7 \times 10^{-4}$ mol),
0.024 g of 2,2,6,6-tetramethyl-1-piperidynyloxy (i.e. $1.53 \times 10^{-4}$ mol of TEMPO).

The reaction mixture is then brought to 143° C. The moment at which the reaction mixture reaches the temperature of 143° C. is defined as the starting point of the test. After 40 min, 90% conversion is obtained. The percentage of conversion corresponds to the % of monomer converted into polymer and is calculated by proton NMR spectroscopy with integration of the peaks corresponding to the polymer and to the monomer, and by weighing the polymer obtained.

The final polystyrene, after purification, has a number-average molecular mass of 35,000 and a polydispersity index of 1.8. The purification step consists in dissolving the polystyrene in THF (about ten times the mass of polystyrene) and precipitating the solution from 100 volumes of methanol. The powder obtained is filtered off and then dried. The number-average molecular mass (written as Mn) is determined by gel permeation chromatography (GPC) in THF, after calibration with standard polystyrene samples, and the polydispersity index (written as Ip) is the ratio of the weight-average molecular mass to the number-average molecular mass, both measured by GPC.

EXAMPLE 2 (COMPARATIVE)

Preparation of a Homopolystyrene in the Absence of Tempo

The process is performed as in Example 1, except that no TEMPO is added. For the same polymerization conditions, after reaction for 40 min, 90% conversion is obtained and the polystyrene synthesized has an Mn of 39,500 and a polydispersity index of 2.2.

EXAMPLE 3

Synthesis of Polystyrene-b-Poly (n-Butyl Acrylate) Block Copolymers

The reagents below are introduced at room temperature into a 100 ml glass round-bottomed flask under a nitrogen atmosphere, fitted with a mechanical stirrer and a temperature-adjustment system:

20 g of styrene (i.e. 0.192 mol),
0.216 g of dicumyl peroxide (i.e. $8 \times 10^{-4}$ mol),
0.0245 g of TEMPO (i.e. $1.57 \times 10^{-4}$ mol).

The reaction mixture is then brought to 143° C. The moment at which the reaction mixture reaches the temperature of 143° C. is defined as the starting point of the text. After 35 min, a sample is taken and analysed: the degree of conversion is 90% and the polystyrene has an Mn of 21,000 and a polydispersity index of 1.8.

While maintaining the temperature of the reaction mixture at 143° C., 30 g of butyl acrylate are added. As the reaction proceeds, the viscosity of the mixture increases. After reaction for 20 min, the reaction mixture sets to a solid, which implies that the polymerization has stopped. A sample is then taken in order to be analysed by GPC.

Next, the reaction mixture is dissolved in THF (in about 10 times the mass of polymer obtained) and is then precipitated from 100 volumes of methanol. The copolymer obtained has an Mn of 32,000 and a polydispersity index of 3. The GPC chromatogram is monomodal without a shoulder. Furthermore, the GPC chromatogram is shifted towards high masses when compared with the chromatogram obtained immediately before addition of butyl acrylate. These two results clearly show that copolymerization has taken place.

EXAMPLE 4

Synthesis of PS-b-PBuA Block Copolymers

The process is performed as in the above example, except that half as much initiator and stable free radical (TEMPO) are used relative to the monomer. The final copolymer has an Mn of 57,000 and an Ip of 2.7. The GPC curve is monomodal without a shoulder. Furthermore, it is shifted towards high masses when compared with the chromatogram obtained immediately before addition of butyl acrylate, which shows that copolymerization has indeed taken place.

Differential calorimetry analysis (DSC for "Differential Scanning Calorimetry") shows the presence of two glass transition temperatures at −45° C. and at 95° C., respectively characterizing the poly(butyl acrylate) block and the polystyrene block.

EXAMPLE 5 (COMPARATIVE)

The process is performed as in Example 3, except that no TEMPO is added.

The final copolymer has an Mn of 27,000 and an Ip of 5.4. The GPC curve is bimodal and one of its peaks is identical to that obtained before the attempt to produce the poly(butyl acrylate) block. This indicates that copolymerization has not taken place and that the product finally obtained is only a mixture of two homopolymers.

EXAMPLE 6

The process is performed as in Example 4, except that the butyl acrylate is replaced by the same number of moles of butyl methacrylate and the purification step is carried out in hexane.

The final copolymer has an Mn of 52,000 and an Ip of 1.9. The GPC analysis indicates that copolymerization has indeed taken place. The DSC analysis shows the presence of two glass transition temperatures at 35° C. and 95° C., respectively characterizing the poly(butyl methacrylate) block and the polystyrene block.

EXAMPLE 7 (COMPARATIVE)

Attempt To Prepare a Polystyrene/Poly(Butyl Methacrylate) Block Copolymer in the Presence of a High Concentration of Tempo The following reagents are introduced at room temperature into a 100 ml glass round-bottomed flask under a nitrogen atmosphere, fitted with a mechanical stirrer and a temperature-adjustment system:

40 g of styrene (i.e. 0.384 mol), 0.775 g of benzoyl peroxide (i.e. $3.22 \times 10^{-3}$ mol), 0.5 g of TEMPO (i.e. $3.2 \times 10^{-3}$ mol).

The reaction mixture is first maintained at 95° C. for 3.5 hours and is then brought to 143° C. The moment at which the reaction mixture reaches the temperature of 143° C. is defined as the starting point of the test. After 32 hours, 83% conversion is obtained. The number-average molecular mass is 9200 for a polydispersity index of 1.7.

While maintaining the temperature of the reaction mixture at 143° C., 30 g of butyl methacrylate are added. In 10 hours of stirring, the viscosity of the mixture does not change. A sample is then taken for analysis by GPC. The GPC analysis shows that the polystyrene made during the first step has not changed during the second step (heating in the presence of butyl methacrylate).

The reaction mixture is then dissolved in THF (in about 10 times the mass of polymer obtained) and is then precipitated from 100 volumes of methanol. Analysis by infrared spectroscopy and by proton NMR shows that there is no methacrylate sequence in the final polymer.

What is claimed is:

1. Process for the preparation of a polymer or copolymer having a polydispersity of from about 1.8 to about 1.9, comprising a step of polymerization or copolymerization of at least one monomer via a radical route, in the presence of a polymerization or copolymerization initiator and of a stable free radical, the step being such that, per 100 mol of monomer, the following relationships are confirmed:

$$\frac{F_{SFR} \times (SFR)}{F_{INIT} \times (INIT)} < 0.1;$$

wherein $F_{SFR} \times (SFR)$ ranges from 0.0001 to 0.2 mol, and further wherein $F_{INIT} \times (INIT)$ ranges from 0.1 to 20 mol, wherein:

(SFR) represents the number of moles of stable free radical in the polymerization or copolymerization medium, $F_{SFR}$ represents the functionality of the stable free radical and is equal to 1 or 2, (INIT) represents the number of moles of polymerization or copolymerization initiator in the polymerization or copolymerization medium, and ($F_{INIT}$) represents the functionality of the initiator and is equal to 1.

2. Process according to claim 1, wherein the step is such that the following relationship is confirmed:

$$0.005 < \frac{F_{SFR} \times (SFR)}{F_{INIT} \times (INIT)} < 0.05$$

3. Process according to claim 1, wherein the step is such that, per 100 mol of elastomer, $F_{INIT} \times (INIT)$ ranges from 0.1 to 2 mol.

4. Process according to claim 1, wherein the step is such that, per 100 mol of monomer, $F_{SFR} \times (SFR)$ ranges from 0.0005 to 0.1.

5. Process according to claim 1, wherein the step of the process according to the invention is carried out in the presence of a solvent in a proportion of from 0 to 20% by weight of the sum of the mass of monomer and solvent.

6. Process according to claim 5, wherein the step of the process according to the invention is carried out in the presence of a solvent in a proportion of from 0 to 10% by weight of the sum of the mass of monomer and solvent.

7. Process according to claim 6, wherein the step of the process according to the invention is carried out in the absence of solvent.

8. Process according to claim 1, wherein the step is carried out at from 100 to 250° C.

9. Process according to claim 8, wherein the step is carried out at from 130 to 200° C.

10. Process according to claim 1, wherein the step is carried out with a degree of conversion of monomer of greater than 50%.

11. Process according to claim 10, wherein the step is carried out with a degree of conversion of monomer of greater than 90%.

12. Process according to claim 1, wherein the temperature during the step and in that the initiator are chosen such that the half-life of the initiator at the said temperature ranges from 30 seconds to 1 hour.

13. Process according to claim 12, wherein the half-life of the initiator at the chosen temperature ranges from 5 minutes to 30 minutes.

14. Process according to claim 1, wherein the initiator is chosen from diacyl peroxides, dialkyl peroxides and peroxyacetals.

15. Process according to claim 1, wherein at least one monomer is from the methacrylate family.

16. Process according to claim 1, wherein at least one monomer is a butyl methacrylate.

17. Process for the preparation of a block copolymer having a polydispersity of from about 1.8 to about 1.9, comprising a step according to claim 1, leading to the formation of a first living block, followed by the formation of at least one block of a monomer which is different from the one used for the said step; the step being such that, per 100 mol of monomer, the following relationships are confirmed:

$$\frac{F_{SFR} \times (SFR)}{F_{INIT} \times (INIT)} < 0.1;$$

wherein $F_{SFR} \times$(SFR) ranges from 0.0001 to 0.2 mol, and further wherein $F_{INIT} \times$(INIT) ranges from 0.1 to 20 mol, wherein:
(SFR) represents the number of moles of stable free radical in the polymerization or copolymerization medium,
$F_{SFR}$ represents the functionality of the stable free radical and is equal to 1 or 2,
(INIT) represents the number of moles of polymerization or copolymerization initiator in the polymerization or copolymerization medium, and
($F_{INIT}$) represents the functionality of the initiator and is equal to 1.

18. Process for the preparation of a diblock polymer having a polydispersity of from about 1.8 to about 1.9, comprising a step according to claim 1, leading to a first living block of a first monomer, followed by a step during which the first living block is placed in the presence of a second monomer which is polymerized, so as to form a second block attached to the first block; the step being such that, per 100 mol of monomer, the following relationships are confirmed:

$$\frac{F_{SFR} \times (SFR)}{F_{INIT} \times (INIT)} < 0.1;$$

wherein $F_{SFR} \times$(SFR) ranges from 0.0001 to 0.2 mol, and further wherein $F_{INIT} \times$(INIT) ranges from 0.1 to 20 mol, wherein:
(SFR) represents the number of moles of stable free radical in the polymerization or copolymerization medium,
$F_{SFR}$ represents the functionality of the stable free radical and is equal to 1 or 2,
(INIT) represents the number of moles of polymerization or copolymerization initiator in the polymerization or copolymerization medium, and
($F_{INIT}$) represents the functionality of the initiator and is equal to 1.

19. Process for the preparation of a triblock polymer having a polydispersity of from about 1.8 to about 1.9, comprising a step of polymerization of a third monomer in the presence of the diblock polymer prepared by the process of claim 18, so as to form a third block attached to the diblock polymer; the step being such that, per 100 mol of monomer, the following relationships are confirmed:

$$\frac{F_{SFR} \times (SFR)}{F_{INIT} \times (INIT)} < 0.1;$$

wherein $F_{SFR} \times$(SFR) ranges from 0.0001 to 0.2 mol, and further wherein $F_{INIT} \times$(INIT) ranges from 0.1 to 20 mol, wherein:
(SFR) represents the number of moles of stable free radical in the polymerization or copolymerization medium,
$F_{SFR}$ represents the functionality of the stable free radical and is equal to 1 or 2,
(INIT) represents the number of moles of polymerization or copolymerization initiator in the polymerization or copolymerization medium, and
($F_{INIT}$) represents the functionality of the initiator and is equal to 1.

20. Process according to claim 17, wherein, between the formation of two blocks, the temperature is at least equal to the lower temperature used to produce one of the two blocks.

21. Process according to claim 17, wherein, between the formation of two blocks, the temperature remains at least equal to 100° C.

22. Process for the preparation of a grafted polymer having a polydispersity of from about 1.8 to about 1.9, comprising a step according to claim 1, in which step the initiator is a macroinitiator comprising a polymer in which at least one atom is capable of taking a radical form capable of initiating the polymerization of a first monomer in order to form a first living block grafted to the polymer; the step being such that, per 100 mol of monomer, the following relationships are confirmed:

$$\frac{F_{SFR} \times (SFR)}{F_{INIT} \times (INIT)} < 0.1;$$

wherein $F_{SFR} \times$(SFR) ranges from 0.0001 to 0.2 mol, and further wherein $F_{INIT} \times$(INIT) ranges from 0.1 to 20 mol, wherein:
(SFR) represents the number of moles of stable free radical in the polymerization or copolymerization medium,
$F_{SFR}$ represents the functionality of the stable free radical and is equal to 1 or 2, (INIT) represents the number of moles of polymerization or copolymerization initiator in the polymerization or copolymerization medium, and ($F_{INIT}$) represents the functionality of the initiator and is equal to 1.

23. Process for the preparation of a polymer grafted with a diblock copolymer, comprising a step of polymerization of a second monomer in the presence of the polymer grafted by the process of claim 22, wherein said polymer grafted with said diblock copolymer has a polydispersity of from about 1.8 to about 1.9; the step being such that, per 100 mol of monomer, the following relationships are confirmed:

$$\frac{F_{SFR} \times (SFR)}{F_{INIT} \times (INIT)} < 0.1;$$

wherein $F_{SFR} \times$(SFR) ranges from 0.0001 to 0.2 mol, and further wherein $F_{INIT} \times$(INIT) ranges from 0.1 to 20 mol, wherein:

(SFR) represents the number of moles of stable free radical in the polymerization or copolymerization medium, $F_{SFR}$ represents the functionality of the stable free radical and is equal to 1 or 2, (INIT) represents the number of moles of polymerization or copolymerization initiator in the polymerization or copolymerization medium, and ($F_{INIT}$) represents the functionality of the initiator and is equal to 1.

24. Process according to claim 1, wherein it is carried out at least partially in an extruder.

25. Process according to claim 24, wherein all of the polymerization steps are carried out in an extruder.

26. Process according to claim 18, wherein, between the formation of two blocks, the temperature is at least equal to the lower temperature used to produce one of the two blocks.

27. Process according to claim 19, wherein, between the formation of two blocks, the temperature is at least equal to the lower temperature used to produce one of the two blocks.

28. Process according to claim 18, wherein, between the formation of two blocks, the temperature remains at least equal to 100° C.

29. Process according to claim 19, wherein, between the formation of two blocks, the temperature remains at least equal to 100° C.

* * * * *